(12) United States Patent
Nakata

(10) Patent No.: US 7,313,073 B2
(45) Date of Patent: Dec. 25, 2007

(54) OPTICAL PICKUP AND OPTICAL DISK SYSTEM

(75) Inventor: Naotaro Nakata, Kyoto (JP)

(73) Assignee: Rohm Co., Ltd., Kyoto-shi (JP)

( * ) Notice: Subject to any disclaimer, the term of this patent is extended or adjusted under 35 U.S.C. 154(b) by 333 days.

(21) Appl. No.: 10/383,974

(22) Filed: Mar. 7, 2003

(65) Prior Publication Data

US 2003/0174633 A1    Sep. 18, 2003

(30) Foreign Application Priority Data

Mar. 13, 2002   (JP) ............................. 2002-068583

(51) Int. Cl.
G11B 7/135 (2006.01)
G11B 7/08 (2006.01)
G11B 7/22 (2006.01)

(52) U.S. Cl. .............................. 369/112.23; 369/44.12; 369/121

(58) Field of Classification Search ............. 369/44.24, 369/112.02, 112.23, 112.24, 11.229, 112.01, 369/112.16, 112.17, 94, 112.08, 112.26, 112.07, 369/121, 107, 116, 44.32, 44.12, 44, 12; 356/3, 5.09, 498, 499; 372/20, 102, 45.01, 372/18, 28
See application file for complete search history.

(56) References Cited

U.S. PATENT DOCUMENTS 5,097,464 A * 3/1992 Nishiuchi et al. ...... 369/112.29
5,267,016 A * 11/1993 Meinzer et al. ............. 356/498
5,313,448 A * 5/1994 Sukeda et al. ............... 369/121
5,659,533 A * 8/1997 Chen et al. ............. 369/112.01
5,966,364 A * 10/1999 Kamatani ............... 369/112.07

(Continued)

FOREIGN PATENT DOCUMENTS

JP       59-009086 B      2/1984

(Continued)

OTHER PUBLICATIONS

Roy Lang and Kohroh Kobayashi, External Optical Feedback Effects on Semiconductor Injection Laser Properties, IEEE Journal of Quantum Electronics, vol. QE-16, No. 3, Mar. 1980.*

(Continued)

*Primary Examiner*—Andrea Wellington
*Assistant Examiner*—Kim-Kwok Chu
(74) *Attorney, Agent, or Firm*—Hedman & Costigan PC; James V. Costigan

(57) ABSTRACT

An optical pickup for reading information written on an optical disk is equipped with a laser diode having a front facet which emits light, a parallel light ray portion which collimates the emitted light from the laser diode, means for focusing collimated output light onto the optical disk, means for receiving reflected light from the optical disk, and an optical element having an index of refraction of 1 or higher for adjusting the length of the optical path between the front facet of the laser diode and the optical disk, wherein the optical element is inserted in the parallel light ray portion when the optical path length lies within the range of the expression "$(n-0.5\pm0.25)\times$ the effective cavity length of the laser diode" (where n is a positive integer) in order to reduce the noise in the emitted light of the laser diode.

4 Claims, 6 Drawing Sheets

U.S. PATENT DOCUMENTS 6,049,554 A * 4/2000 Lang et al. .................. 372/20
6,567,365 B1 * 5/2003 Hendriks et al. ...... 369/112.02
6,700,854 B1 * 3/2004 Mizuishi et al. ....... 369/112.16

FOREIGN PATENT DOCUMENTS

| JP | 01-287850 | 11/1989 |
| JP | 05-089465 A | 4/1993 |
| JP | 08-139418 A | 5/1996 |
| JP | 2000-155972 A | 6/2000 |

OTHER PUBLICATIONS

IEEE Journal of Quantum Electron., "External Optical Feedback Effects on Semiconductor Injection Laser Properties", QE-16, p. 347, 1980.

Notification of Reason for Refusal, Japan Patent Office Action, Serial No. JP2002-068583, Mar. 22, 2004.

* cited by examiner

OPTICAL PICKUP AND OPTICAL DISK SYSTEM

BACKGROUND OF THE INVENTION

1. Field of the Invention

The present invention is related to an optical pickup which reads information written on an optical disk, and an optical disk system equipped with an optical pickup.

2. Description of the Prior Art

Because a laser diode used in an optical pickup is an open-type cavity, the laser diode forms a cavity easily even with an external reflector, and because the emitted light of the laser diode is reflected back from the outside as return light, the oscillation can become unstable when such return light is incident on the laser diode. For this reason, when there is a lot of return light, noise is created in the emitted light of the laser diode.

For example, when the emitted light from the laser diode of the optical pickup is focused on an optical disk, the light is diffracted by the pits on the optical disk and forms modulated reflected light. This reflected light passes through an objective lens of the optical pickup and optical disk are read. In prior art optical pickups, because all the reflected light from the optical disk is made to be incident on the light detector by a polarizing beam splitter and a $\lambda/4$ plate, the reflected light does not return to the laser diode. Recently, a low-cost half mirror has been used, and in this case approximately 50% of the reflected light returns to the laser diode as return light. In the case where the laser diode receives the return light from the optical disk, the laser diode oscillates in a compound cavity mode which combines the two cavities of an internal cavity formed between the front facet and the rear facet of the diode chip, and an external cavity formed between the optical disk and the front facet of the diode chip.

As a method of reducing the effect of the return light, Japanese Patent Application No. JP59-009086-B discloses a technique for reducing the effect of the return light by superimposing a high-frequency electric current on the direct electric current driving the laser diode oscillating in a single mode in order to create a multiple mode oscillation. This technique is applied to an AlGaAs high-output laser diode and an InAlGaP visible light laser diode which are difficult to oscillate in a multiple mode with only a direct electric current driving.

In prior art optical pickups, the length of the optical path between the optical disk and the front facet of the laser diode is from 50 mm to about 70 mm, and is long compared to the coherent distance of the emitted light of the laser diode. In this case, even when return light is incident on the laser diode, because an external cavity is not formed, there are no large changes to the oscillation state of the laser diode. In accordance with the miniaturization of apparatuses in recent years, the length of the optical path between the optical disk and the front facet of the laser diode in the optical pickup has been shortened to about 30 mm, but even in such multiple mode oscillating laser diodes, the effect of the return light can not be ignored.

In this connection, Japanese Patent Application No. JP05-089465-A discloses a technique for creating a multiple mode oscillation by superimposing a high-frequency electric current on the direct electric current, wherein the frequency of the high-frequency electric current is controlled in accordance with the length of the optical path between the optical disk and the laser diode so that the return light to the laser diode returns to the laser diode during the period when the laser oscillation is stopped. However, in the case of a CD-R/RW, MD and DVD, because the optical disk has a small diameter and the playback device has a small size, the length of the optical path between the optical disk and the front facet of the laser diode is from 30 mm to 50 mm. With regard to this optical path length, when the reflected return light to the laser diode is made to return to the laser diode during the period when the laser oscillation is stopped, the frequency of the high-frequency electric current changes from 2.5 GHz to 1.5 GHz. A strong shielding is required around the driving circuit to prevent this high-frequency electric current from having an effect on the other electronic circuits inside the apparatus and it is not realistic.

Further, Japanese Patent Application No. JP08-139418-A proposes a method of superimposing a high-frequency electric current having a frequency of 400 MHz or higher in accordance with the length of the optical path between the optical disk and the front facet of the laser diode. However, in optical pickups which use current CD-R/RW, MD and DVD, the laser diode has parallel capacitance resulting from the pn reverse bias barrier, and the lead wire for connecting the laser diode chip and the package has inductance. Accordingly, because the resonance frequency is determined by the parallel capacitance and the inductance, it is difficult to use this method of superimposing a high-frequency electric current having a frequency of 400 MHz or higher.

On the other hand, R. Lang reports the effect due to return light in a single mode oscillation laser diode (IEEE Journal of Quantum Electron., QE-16, p. 347, 1980). According to this report, in the case where the distance from the front facet of the laser diode to an external mirror is an integer multiple of the effective cavity length of the laser diode, the emitted light of the laser diode does not receive an effect, but in the case where the distance from the front facet of the laser diode to an external mirror is shifted away from an integer multiple of the effective cavity length of the laser diode, because the phase conditions of the internal cavity of the laser diode and the external cavity are shifted, it is clearly understood that the laser oscillation is unstable and high-frequency noise is included in the emitted light. In this regard, when the index of refraction of the laser diode is given by m, the effective cavity length is the length represented by "cavity length of laser diode×m". This report is for the case of a single mode oscillation laser diode, and it is unclear whether or not the results can be applied to a multiple mode oscillation laser diode.

Further, in optical pickups, it is extremely difficult to measure whether the length of the optical path between the optical disk and the front facet of the laser diode is a multiple of the effective cavity length. Namely, because the index of refraction m of the laser diode changes depending on the light confining ratio of the laser diode, large errors occur when the effective cavity length is compared with about 20 times the optical path length. Further, it is difficult to accurately measure the thickness of an optical element lying between the optical disk and the front facet of the laser diode.

SUMMARY OF THE INVENTION

In order to clearly understand the behavior of a multiple mode oscillation laser diode which was not clearly understood in the prior art, the present inventor elucidated the relationship between the length of the optical path from the optical disk to the multiple mode oscillation laser diode, the noise and emission spectrum of the emitted light of the laser diode.

Namely, the length of the optical path between the front facet of a laser diode and a reflecting mirror were changed, and the effects thereof were measured. The measurement system is shown in FIG. 1. The emitted light from a laser diode 11 is formed into parallel light by a collimating lens 14. A portion of such parallel light passes through a half mirror 18, and is then focused on a total reflection mirror 20 by an objective lens 15. The remaining portion of the parallel light is reflected by the half mirror 18 and sent to an optical spectrum analyzer 21 which analyzes the spectrum of the emitted light of the laser diode 11, and a noise measuring device 22 which measures the noise of the emitted light of the laser diode 11. By moving the objective lens 15 and the total reflection mirror 20 together as one unit, a structure was provided in which it was possible to change the distance between the laser diode 11 and the total reflection mirror 20.

The length of the optical path between the front facet of the laser diode 11 and the total reflection mirror 20 in the measurement system of FIG. 1 was changed, and the results of the measurements of the spectrum and noise of the emitted light of the laser diode 11 are shown in FIG. 2. In FIG. 2, the bottom graph shows the noise of the emitted light of the laser diode 11 with respect to the length of the optical path between the front facet of the laser diode 11 and the total reflection mirror 20, and the top graphs show the spectrum of the emitted light of the laser diode 11 for specific optical path lengths. The optical path lengths are represented by the approximate distances and are not accurate absolute values, but because a precise positioner was used, accurate relative values were obtained. The laser diode 11 used in this measurement system had a cavity length of 0.35 mm and an index of refraction of 4.3. Accordingly, the effective cavity length was 0.35 mm×4.3=1.5 mm. When the optical path length was changed, the amount of noise of the emitted light of the laser diode 11 was changed in accordance with the period of the effective cavity length of the laser diode 11. Because this period is 1.5 mm, it was understood that noise increased or decreased at integer multiples of the effective cavity length of the laser diode 11. When the Lang report is applied to this multiple mode oscillation laser diode 11, a large amount of noise (point C in FIG. 2) occurred in the emitted light of the laser diode 11 when the optical path length was an "(n−0.5) multiple of the effective cavity length of the laser diode 11" (where n is a positive integer, and this is the same for the description given below), and a relatively small amount of noise (point A in FIG. 2) occurred in the emitted light of the laser diode 11 when the optical path length was an "n multiple of the effective cavity length of the laser diode 11."

The spectrums of the emitted light of the laser diode 11 at these times are also shown in FIG. 2. The times when the noise in the emitted light of the laser diode 11 were small (point A in FIG. 2) were understood to be the times when the optical path length was an "n multiple of the effective cavity length of the laser diode 11" from the fact that the laser diode 11 oscillates with the same light spectrum as that for the time when there is no return light, and the times when the noise in the emitted light of the laser diode 11 was large (point C in FIG. 2) were understood to be the times when the optical path length was an "(n−0.5) multiple of the effective cavity length of the laser diode 11" from the fact that the laser diode 11 oscillates with the light spectrum determined by an external cavity superimposed on the spectrum of the emitted light of the laser diode 11. From these measurement results, it became clear that the Lang's report can also be applied to a multiple mode oscillation laser diode.

At the times when the optical path length was an "(n−0.5) multiple of the effective cavity length of the laser diode 11", there appeared to be a mode for the case where there is no return light, and a mode for the case where the wavelength is shifted by return light. This is due to the oscillation by both an internal cavity and an external cavity. Namely, when a 1 nsec emission pulse is begun, the return light from the total reflection mirror 20 separated by 30 mm is incident 200 psec later. As a result, the laser diode 11, which was oscillating as an internal cavity during the first 200 psec, receives the return light and oscillates also as an external cavity.

Accordingly, the optical pickup needs to be set up so that the distance from the front facet of the laser diode to the optical disk is not an "(n+0.5) multiple of the effective cavity length of the laser diode". However, the cavity length of a laser diode is different for each laser diode, and the effective index of refraction of a laser diode changes depending on the light confining ratio of the laser diode. The light confining ratio depends on the far-field expansion angle of the laser diode. For this reason, even for a laser diode having the same wavelength, for example, there are subtle changes depending on the structure of the stripe portion. Further, there is a position where the noise in the emitted light of the laser diode becomes a maximum when these subtle changes are magnified n times, but it is difficult avoid this position which is determined from the effective cavity length of the laser diode mounted in advance when the optical pickup is set up.

In order to solve these problems, it is an object of the present invention to provide an optical pickup having a structure which makes it possible to adjust the length of the optical path between the front facet of the laser diode and an optical disk when the optical pickup is manufactured, and an optical disk system equipped with such optical pickup.

In order to achieve the object stated above, in the invention of an optical pickup according to claim 1, when the length of the optical path between the front facet of the laser diode and the optical disk lies within the range of the expression "(n−0.5±0.25)×the effective cavity length of the laser diode" (where n is a positive integer), an optical element having an index of refraction of 1 or higher for adjusting the optical path length is inserted in the parallel light ray portion which collimates the emitted light from the laser diode.

Further, the invention of an optical disk system according to claim 2 includes the optical pickup of claim 1, an optical pickup sliding mechanism, and an optical disk rotating mechanism.

In this way, the noise in the emitted light of the laser diode can be reduced by adjusting the optical path length so that it is not an "(n−0.5) multiple of the effective cavity length of the laser diode".

DETAILED DESCRIPTION OF THE PREFERRED EMBODIMENTS

Embodiment 1

Figure 1:
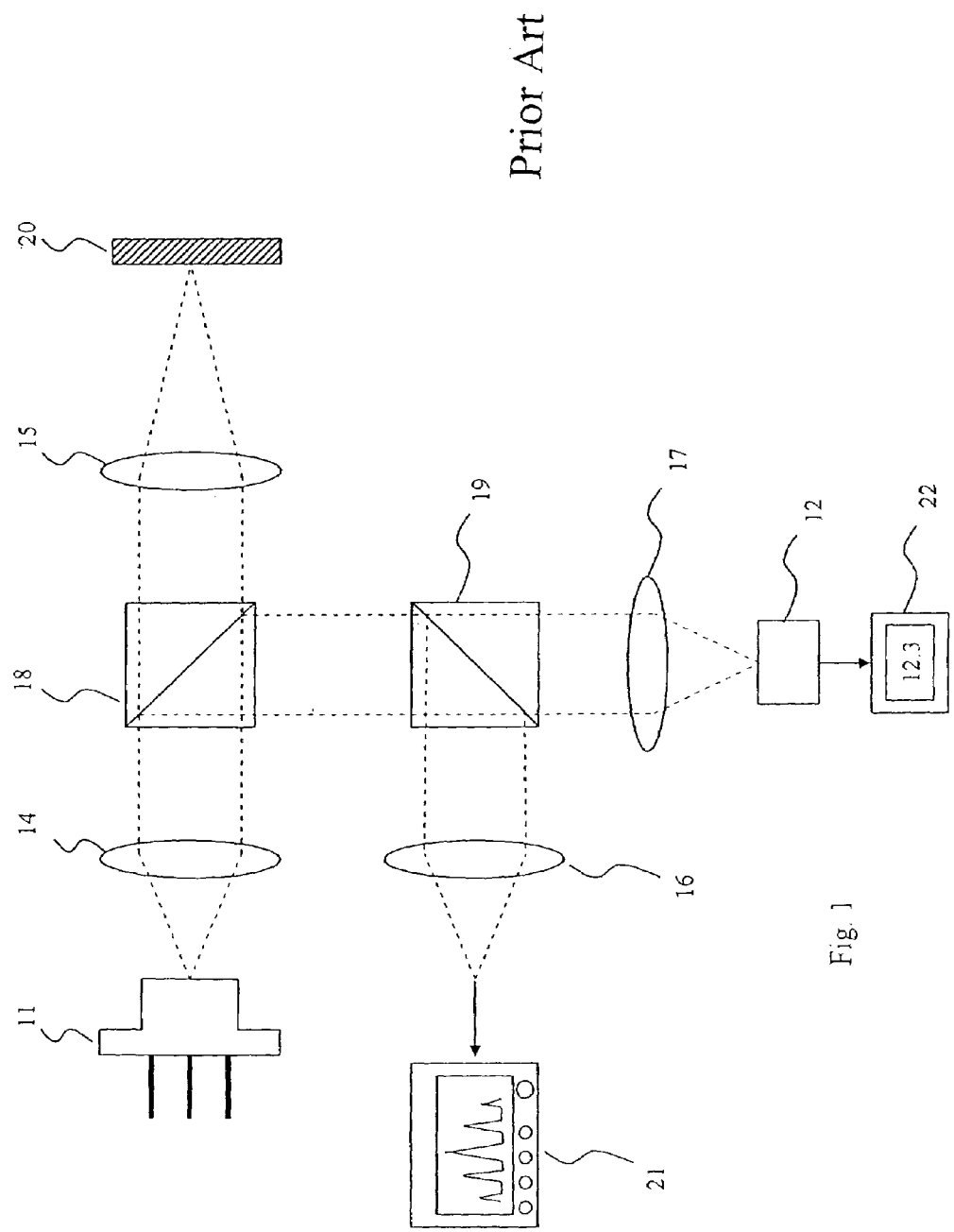
FIG. 1 is a schematic view of a measuring system for elucidating the mechanism of the generation of noise due to return light forming the basis of the present invention.
Figure 2:
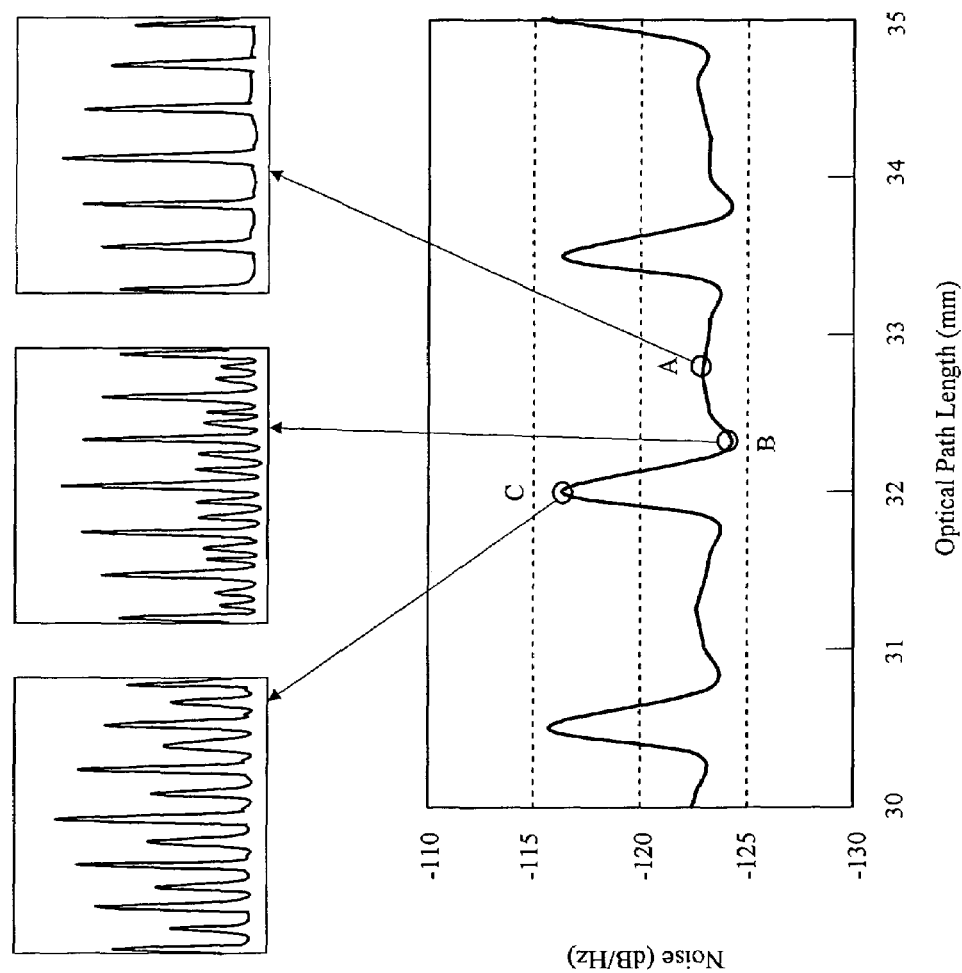
FIG. 2 shows a graph of the measurement results of noise due to return light forming the basis of the present invention.
Figure 3:
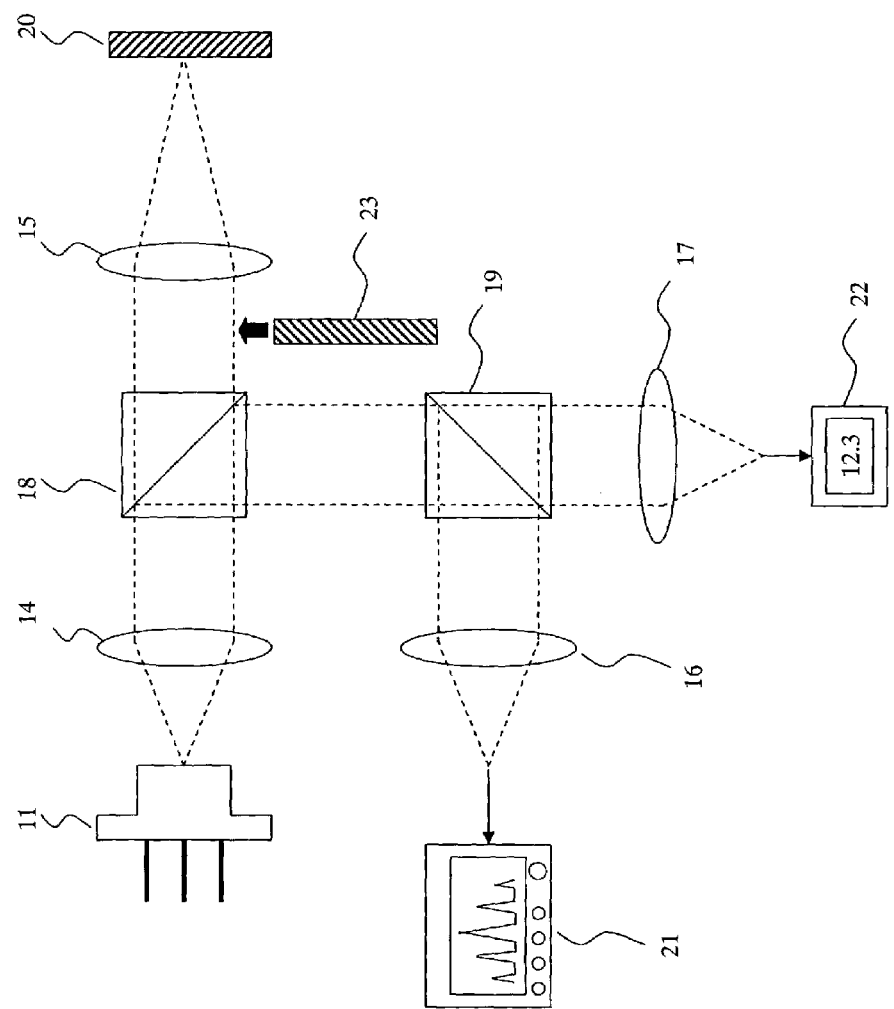
FIG. 3 is a schematic view of a measuring system for confirming the effectiveness of the present invention.
Figure 4:
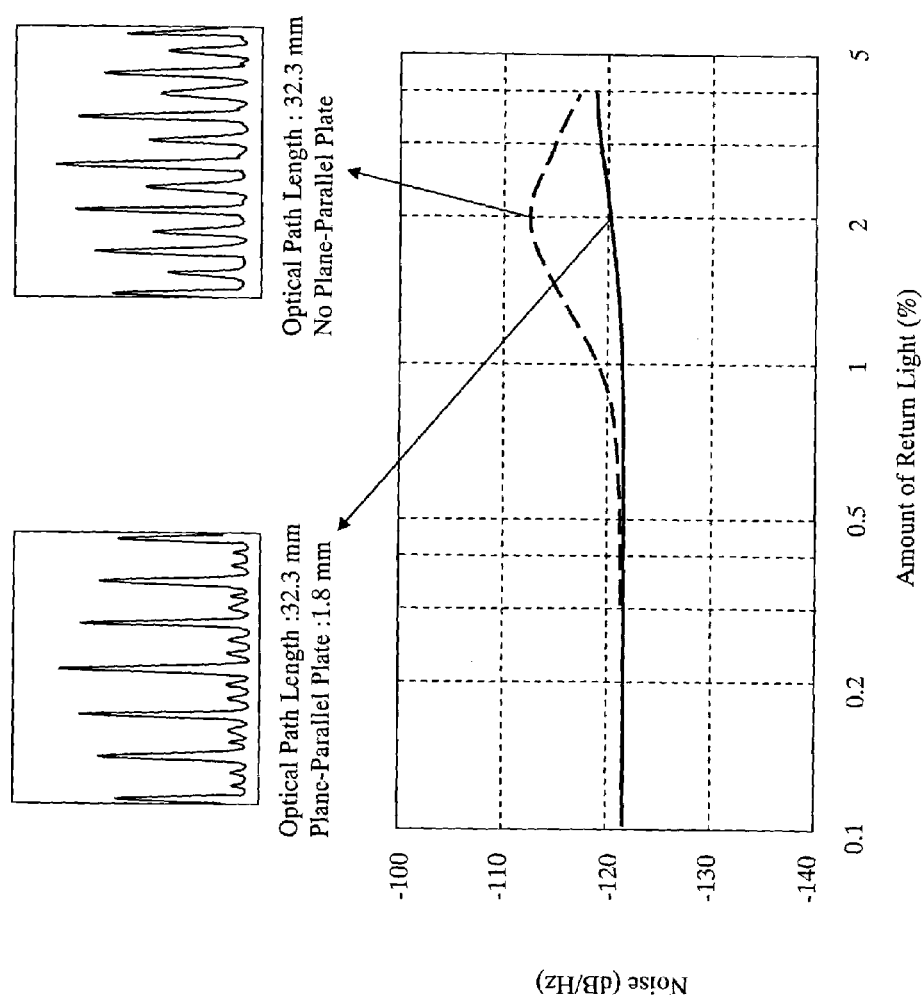
FIG. 4 shows a graph of the measurement results which confirm the effectiveness of the present invention.

The effectiveness of inserting and removing an optical element for adjusting the optical path length in various laser diodes was confirmed. The measurement system of FIG. 3 shows a structure in which a plane-parallel plate 23 made of glass is inserted as an optical element for adjusting the optical path length in the parallel light ray portion where the emitted light from the laser diode 11 is collimated in the measurement system of FIG. 1. In the measurement system of FIG. 3, the noise in the emitted light of the laser diode 11 is a maximum when the length of the optical path between the front facet of the laser diode 11 and the total reflection mirror 20 is 32.3 mm. In this regard, when the optical path length was 32.3 mm, the amount of return light was changed, and the noise was measured. The measurement results are shown in FIG. 4. When the noise in the emitted light of the laser diode 11 was measured for the times when the plane-parallel plate 23 made of glass having a thickness of 1.8 mm and an index of refraction of 1.5 was inserted and removed, it was clearly understood from FIG. 4 that the noise was reduced by the insertion of the plane-parallel plate 23. The insertion of the plane-parallel plate 23 is equivalent to extending the length of the optical path between the front facet of the laser diode 11 and the total reflection mirror 20 by only 1.8×(1.5−1)=0.9 mm. Namely, results equivalent to an optical path length of 33.2 mm in FIG. 2 were obtained. When the lasing spectrum of the emitted light of the laser diode 11 at the time when the plane-parallel plate 23 was inserted in FIG. 4 is analyzed, it is understood that the lasing wavelength of the external cavity roughly matches the oscillation wavelength of the internal cavity.

In the adjustment carried out by only inserting or removing the plane-parallel plate 23, effective results can be obtained by providing the "(n−0.5) multiple of the effective cavity length of the laser diode" with a margin of ±0.25 multiple of the effective cavity length of the laser diode".

Accordingly, when the length of the optical path between the front facet of the laser diode and the optical disk is within the range of the expression "(n−0.5±0.25) multiple of the effective cavity length of the laser diode" (where n is a positive integer), it became clear that an effective solution is achieved by inserting a plane-parallel plate for adjusting the optical path length in the parallel light ray portion where the emitted light from the laser diode is collimated.

Figure 5:
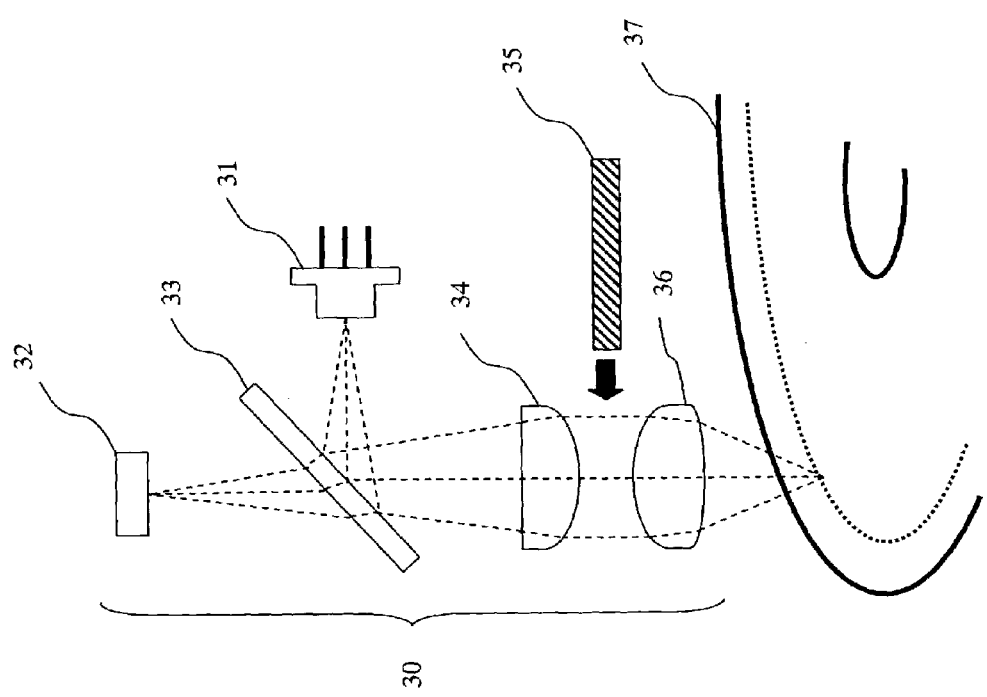
FIG. 5 is a schematic view of a preferred embodiment of an optical pickup according to the present invention.

An optical pickup structure which makes it possible to insert and remove a plane-parallel plate for adjusting the optical path length is shown in FIG. 5. FIG. 5 shows the rough structure of an optical pickup 30 which reads information recorded on an optical disk 37. The emitted light from a laser diode 31 is reflected by a half mirror 33 and formed into parallel rays of light by a collimating lens 34. The parallel rays of light are focused on the optical disk 37 by an objective lens 36. The reflected light from the optical disk 37 passes through the objective lens 36 and the collimating lens 34, and is received by a light detector 32 after being transmitted through the half mirror 33. In this regard, even with the plane-parallel plate 35 inserted between the collimating lens 34 and the objective lens 36, because the emitted light of the laser diode 31 and the reflected light form parallel rays of light, only the optical path length is extended without any effect on the focusing position.

The plane-parallel plate may have any thickness which makes it possible to change the optical path length by only an "(n−0.5) multiple of the effective cavity length of the laser diode". In this way, when there is a large amount of noise due to return light in the emitted light of the laser diode, such noise can be reduced by inserting the plane-parallel plate. Further, it is possible to prepare a plane-parallel plate which makes it possible to change the optical path length by only an "(n−0.5) multiple of the effective cavity length of the laser diode", and a plane-parallel plate which makes it possible to change the optical path length by only an "n multiple of the effective cavity length of the laser diode", and then either of these two plane-parallel plates may be inserted. Further, it is possible to prepare a plurality of plane-parallel plates having various thicknesses, and then the plane-parallel plate having the optimum thickness may be inserted.

Figure 6:
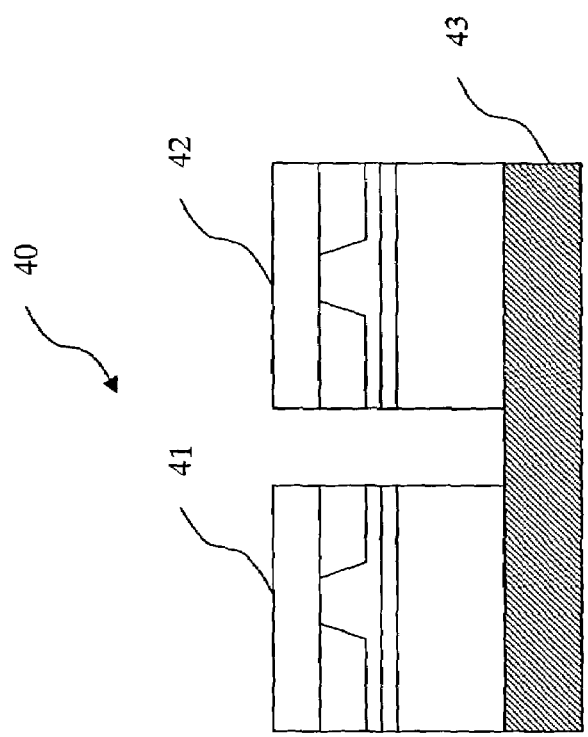
FIG. 6 is a schematic view of a laser diode having two output parts mounted on a substrate.

The laser diode may have two output parts which may have different wavelength. The laser diode of FIG. 6 shows a structure, where two output parts 41, 42 are mounted on a substrate 43. In FIG. 6 the laser diode launches two beams which have different wavelength such as 650 nm and 780 nm.

As described above, the present inventor elucidated the mechanism of the increase of the noise due to return light of a multiple mode oscillation laser diode applied to an optical pickup, and when the length of the optical path between the front facet of the laser diode and the optical disk is within the range of the expression "(n−0.5±0.25)×the effective cavity length of the laser diode" (where n is a positive integer), it became clear that the noise in the emitted light of the laser diode can be reduced by inserting a plane-parallel plate for adjusting the optical path length in the parallel light ray portion where the emitted light from the laser diode is collimated.

Embodiment 2

An optical disk system includes an optical pickup, an optical pickup sliding mechanism, and an optical disk rotating mechanism. The optical pickup sliding mechanism is a mechanism for sliding the optical pickup, and is equipped with a gear wheel and a rail and the like which slide the optical pickup. The optical disk rotating mechanism is equipped with a mechanism which rotates an optical disk. By providing the optical disk system of the present embodiment with the optical pickup described in the first embodiment, it is possible to construct an optical disk system which can operate with a noise level at or below the permitted amount of noise required for such system. disk system which can operate with a noise level at or below the permitted amount of noise required for such system.

As described above, when the length of the optical path between the front facet of the laser diode inside the optical pickup and the optical disk is within the range of the expression "(n−0.5±0.25)×the effective cavity length of the laser diode" (where n is a positive integer), it is possible to construct an optical disk system which can reduce the noise in the emitted light of the laser diode by inserting a plane-parallel plate for adjusting the optical path length in the parallel light ray portion where the emitted light from the laser diode is collimated.

In accordance with the present invention, it is possible to reduce the noise in the emitted light of the laser diode by adjusting the cavity length of the external cavity formed between the front facet of the laser diode and the optical disk with an optical element for adjusting the optical path length.

What is claimed is:

1. An optical pickup for reading information written on an optical disk, comprising:
    a multiple mode oscillation laser diode having a front facet which emits light;
    a parallel light ray portion which collimates the emitted light from the laser diode;
    means for focusing collimated and emitted light onto the optical disk;
    means for receiving reflected light from the optical disk; and
    an optical element having an index of refraction of 1 or higher for adjusting the length of the optical path between the front facet of the laser diode and the optical disk;
    wherein the optical element is inserted in the parallel light ray portion when the optical path length lies within the range of the expression $(n-0.5\pm0.25) \times$ the effective cavity length of the laser diode, where n is a positive integer.

2. An optical disk system, comprising:
    the optical pickup of claim 1
    an optical pickup sliding mechanism; and
    an optical disk rotating mechanism.

3. An optical pickup for reading information written on an optical disk, comprising:
    a multiple mode oscillation laser diode having a front facet which emits light;
    a parallel light ray portion which collimates the emitted light from the laser diode;
    means for focusing collimated and emitted light onto the optical disk;
    means for receiving reflected light from the optical disk; and
    an optical element having an index of refraction of 1 or higher for adjusting the length of the optical path between the front facet of the laser diode and the optical disk;
    wherein the optical element is inserted in the parallel light ray portion, but not in said light focused onto the optical disk, when the optical path length lies within the range of the expression $(n-0.5\pm0.25) \times$ the effective cavity length of the laser diode, where n is a positive integer.

4. An optical disk system, comprising:
    the optical pickup of claim 3
    an optical pickup sliding mechanism; and
    an optical disk rotating mechanism.

* * * * *